(12) United States Patent
Bu et al.

(10) Patent No.: US 12,405,373 B1
(45) Date of Patent: Sep. 2, 2025

(54) METHOD FOR RETRIEVING TROPOSPHERIC WET DELAY AND ATMOSPHERIC WATER VAPOR CONTENT OVER POLAR SEA ICE WITH TECHDEMOSAT-1 SATELLITE GRAZING ANGLE SPACEBORNE GLOBAL NAVIGATION SATELLITE SYSTEM REFLECTOMETRY

(71) Applicant: KUNMING UNIVERSITY OF SCIENCE AND TECHNOLOGY, Kunming (CN)

(72) Inventors: Jinwei Bu, Kunming (CN); Xinyu Liu, Kunming (CN); Qiulan Wang, Kunming (CN); Qihan Wang, Kunming (CN); Xiaoqing Zuo, Kunming (CN); Daming Zhu, Kunming (CN); Yongfa Li, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 19/007,502

(22) Filed: Jan. 1, 2025

(30) Foreign Application Priority Data

Apr. 10, 2024 (CN) .......................... 202410425380.7

(51) Int. Cl.
G01S 13/95 (2006.01)
G01S 13/86 (2006.01)

(52) U.S. Cl.
CPC ............ G01S 13/955 (2013.01); G01S 13/86 (2013.01); G01S 13/958 (2013.01)

(58) Field of Classification Search
CPC ....... G01S 13/955; G01S 13/86; G01S 13/958
See application file for complete search history.

(56) References Cited

FOREIGN PATENT DOCUMENTS

| CN | 108828690 A | 11/2018 |
|---|---|---|
| CN | 111796309 A | 10/2020 |

(Continued)

OTHER PUBLICATIONS

Yang "Troposphere Sensing Using Grazing-Angle GNSS-R Measurement From LEO Satellites", Geophysical research Letter, vol. 50, Issue 24, Dec. 28, 2023 (Year: 2023).*

(Continued)

*Primary Examiner* — Robert W Hodge
*Assistant Examiner* — Helena H Seraydaryan
(74) *Attorney, Agent, or Firm* — Pilloff Passino & Cosenza LLP; Rachel Pilloff; Sean Passino (57) ABSTRACT

A method for retrieving tropospheric wet delay and atmospheric water vapor content over polar sea ice with TDS-1 satellite grazing angle spaceborne GNSS-R is provided, including: S1, obtaining TDS-1 GNSS-R raw intermediate frequency signal data, VMF3 grid data, GPT3 grid data and ERA5 data; S2, correcting an error of tropospheric wet delay estimation of grazing angle spaceborne GNSS-R; S3, constructing a grazing angle spaceborne GNSS-R tropospheric wet delay estimation model; S4, calculating grazing angle spaceborne GNSS-R ZWD; S5, calculating a $T_m$ value of a target point based on GPT3 model, substituting the $T_m$ value into a conversion factor Π, and combining calculated GNSS-R ZWD to obtain a GNSS-R IWV estimated value; and S6, verifying inversion performance of GNSS-R ZWD and integrated water vapor (IWV) by using reference data.

7 Claims, 5 Drawing Sheets

(56) References Cited

FOREIGN PATENT DOCUMENTS

| | | | |
|---|---|---|---|
| CN | 111896977 | A | 11/2020 |
| CN | 113791434 | A | 12/2021 |
| CN | 114297939 | A | 4/2022 |
| CN | 116794682 | A | 9/2023 |
| WO | 2021146775 | A | 7/2021 |
| WO | 2021169318 | A | 9/2021 |

OTHER PUBLICATIONS

Yang Dongkai, et al., Ocean Surface Wind Speed Retrieval Using Spaceborne GNSS-R, Journal of Electronics & Information Technology, Dec. 28, 2017, vol. 40(2): 462-469. (abstract translated) doi: 10.11999/JEIT170490 Related pp. 462-469 Claims involved: 1-8.
Retrieval report dated Sep. 6, 2024 in SIPO application No. 202410425380.7.
Notification to Grant Patent Right for Invention dated Sep. 13, 2024 in SIPO application No. 202410425380.7.

\* cited by examiner

METHOD FOR RETRIEVING TROPOSPHERIC WET DELAY AND ATMOSPHERIC WATER VAPOR CONTENT OVER POLAR SEA ICE WITH TECHDEMOSAT-1 SATELLITE GRAZING ANGLE SPACEBORNE GLOBAL NAVIGATION SATELLITE SYSTEM REFLECTOMETRY

CROSS-REFERENCE TO RELATED APPLICATIONS

This application claims priority to Chinese Patent Application No. 202410425380.7, filed on Apr. 10, 2024, the contents of which are hereby incorporated by reference.

TECHNICAL FIELD

The disclosure belongs to the technical field of application of GNSS meteorology and GNSS-R meteorology to tropospheric parameter inversion, and in particular to a method for retrieving tropospheric wet delay and atmospheric water vapor content over polar sea ice with TechDemoSat-1 (TDS-1) satellite grazing angle spaceborne global navigation satellite system reflectometry (GNSS-R).

BACKGROUND

Integrated water vapor (IWV) is one of the important climate variables defined by the global climate observing system (GCOS). With the influence of global warming, IWV plays a key role in global atmospheric circulation, hydrological cycle and even climate change. Especially in high latitudes, the increase of water vapor content is more significant. Therefore, accurate monitoring of IWV may help people better understand the earth system and improve the accuracy of climate and weather forecast.

For many years, various technologies have been used in the field of meteorology to obtain IWV information, including radiosonde, microwave radiation measurement, lidar, global navigation satellite system (GNSS) receiving station network, very long baseline interferometry (VLBI), GNSS radio occultation (GNSS-RO) and so on. However, these technologies have various limitations (accuracy, observation cost, spatial density, coverage, spatial and temporal resolution, cloud coverage, etc.), especially for ocean and polar ice areas, the demand for accurate IWV observation is still urgent.

In space geodesy and meteorological applications, the tropospheric wet delay is the key parameter for the inversion of atmospheric water vapor content. Modeling of zenith wet delay (ZWD) is very important for IWV inversion or climate monitoring. At present, ray tracing method is one of the most accurate methods to determine ZWD, which is based on a strict theoretical basis, so it is usually used as a benchmark for ZWD modeling and verification. In addition to the ray tracing method, GNSS has been widely proved to be a unique and powerful tool for estimating ZWD, which has the advantages of high precision and high time resolution. However, it is challenging to measure ZWD in harsh environment or places that are not conducive to setting up stations, especially in the ocean (the modeling accuracy is inevitably affected due to the uneven distribution of stations) and polar ice. In addition, many models have been developed to estimate ZWD, including Hopfield model, Saastamoinen model, UNB3 series model, global pressure and temperature (GPT) series model and vienna mapping function (VMF3) model. However, these models have some limitations, and it is difficult to accurately estimate the ZWD of low elevation observation due to the huge changes in space and time of the lower atmospheric humidity. Therefore, ZWD modeling has always been one of the main limiting factors for the analysis and application of space geodetic observation.

Compared with other satellite remote sensing technologies, grazing angle GNSS reflection measurement (Grazing angle GNSS-R, GG-R) has the unique advantages of providing supplementary or enhanced observations in polar regions with high precision, high spatial and temporal resolution and low cost, and may fill some gaps in atmospheric water vapor observation data. Grazing angle spaceborne GNSS reflection measurement method provides a potential alternative way to obtain tropospheric delay and atmospheric water vapor products. For the first time, the existing literature studies the ZWD and IWV inversion of Arctic sea ice and ocean by using the dual-frequency GPS-R carrier phase observation data under the condition of Spire constellation grazing angle (3°-8°). Compared with the data measured by European Centre for Medium-Range Weather Forecasts (ECMWF) fifth generation reanalysis (ERA5) products and Sentinel-3 ocean-land colorimeter (OLCI), the IWV retrieved by Spire GG-R shows good performance. However, there are still two problems at present: 1) the results of inversion of ZWD and IWV using Galileo and BeiDou-3 reflected signals (only using GPS reflected signals leads to limited data coverage) have not been mentioned in the literature; 2) there is a fact that the observation data of dual-frequency GPS reflection signals from Spire and other satellites are not yet open, which seriously limits the further scientific research and exploration of the frontier hot topic by researchers. However, TDS-1 and Cyclone Global Navigation Satellite System (CYGNSS) satellites launched by Britain and the United States in July 2014 and December 2016, respectively, collected single-frequency Multi-GNSS (GPS, Galileo and BeiDou-3) raw intermediate frequency (Raw IF) signal data reflected from some land, inland water bodies, oceans and polar sea ice around the world, and these data were released to the public free of charge, which was retrieved by researchers using spaceborne GG-R technology. But up to now, there is no specific theory, method and experimental results of using TDS-1 (or CYGNSS) single-frequency Multi-GNSS (GPS, Galileo and Beidou-3) RAIF signals to invert ZWD or (and) IWV in the literature.

In view of this, the disclosure proposes a method for retrieving tropospheric wet delay and atmospheric water vapor content over polar sea ice for the first time by using grazing angle spaceborne GNSS-R data collected by TDS-1 satellite.

SUMMARY

The technical problem to be solved by the disclosure is to overcome the shortcomings of the prior art and provide a method for retrieving tropospheric wet delay and atmospheric water vapor content over polar sea ice with TDS-1 satellite grazing angle spaceborne GNSS-R, which may provide the tropospheric wet delay and atmospheric water vapor content estimation values with high precision, high spatio-temporal resolution and low cost, and is close to the performance of other reference data and models.

In order to solve that technical problems, the technical scheme of the disclosure adopts the following basic idea.

The disclosure relates to a method for retrieving tropospheric wet delay and atmospheric water vapor content over polar sea ice with TDS-1 satellite grazing angle spaceborne GNSS-R, including the following steps.

S1, obtaining TDS-1 GNSS-R raw intermediate frequency signal data, VMF3 grid data, global pressure and temperature 3 (GPT3) grid data and ERA5 data;

S2, correcting an error of a tropospheric wet delay estimation of the grazing angle spaceborne GNSS-R;

S3, constructing a grazing angle spaceborne GNSS-R tropospheric wet delay estimation model by combining a grazing angle spaceborne GNSS-R phase measurement theoretical model and a slant tropospheric delay theoretical model considering a mapping function;

S4, calculating grazing angle spaceborne GNSS-R ZWD;

S5, calculating a $T_m$ value of a target point based on a GPT3 model, substituting the $T_m$ value into a conversion factor II, and combining calculated GNSS-R ZWD to obtain a GNSS-R IWV estimated value; and S6, verifying inversion performance of GNSS-R ZWD and integrated water vapor (IWV) by using reference data.

Further, a raw intermediate frequency signal data set of TDS-1 includes raw intermediate frequency signals reflected by single-frequency multi-constellation GNSS (GPS/Galileo/BeiDou-3); the VMF3 grid data is 1° tropospheric wet delay data estimated by a VMF model, GPT3 grid data is atmospheric weighted average temperature data estimated by the GPT3 model, and ERA5 data is atmospheric water vapor content data.

Further, correcting the error of the tropospheric wet delay estimation of the grazing angle spaceborne GNSS-R in the S2 includes dynamic phase components and deviation removal and phase reconstruction; where the dynamic phase components and deviation removal includes clock deviation, orbit error, ionospheric error and phase ambiguity, and the phase reconstruction includes cycle slip identification based on wavelet transform and cycle slip correction based on extended Kalman filter.

Further, the S2 has following sub-steps:

S2.1, before correcting each error, processing raw intermediate frequency observation data of TDS-1 satellite, including closed-loop processing of direct signals and calculation of open-loop (OL) tracking model of reflected signals; where carrier phase $\hat{\Phi}_{R,i}^{OL}$ of the reflected signals calculated by the open-loop tracking model is expressed by a following formula:

$$\hat{\Phi}_{R,i}^{OL} = \tilde{\rho}_R + \delta\hat{\Phi}_{R,i} + \lambda_1 N_{R,i}^{OL} \quad (1)$$

where $N_{R,i}^{OL}$ is phase integer ambiguity, $\delta\hat{\Phi}_{R,i}$ is residual carrier phase estimation, $\lambda_1$ GNSS signal wavelength, and $\tilde{\rho}_R$ is a reflected signal geometric model including cycle slips and signal dynamic deviation.

S2.2, modeling and eliminating dynamic phase components before the cycle slip correction; where a receiver clock deviation is estimated from a direct signal measurement, the current TDS-1 satellite only generates a single frequency measurement result, so an ionospheric correction formula is derived by using vertical total electron content (vTEC) model provided by global ionospheric map (GIM) of international GNSS service (IGS) as follows:

$$I_R = -\frac{40.3}{f_{L1}^2}(sTEC_1 + sTEC_2 - sTEC_D) \quad (2)$$

where for GPS L1 signals, $f_{L1}=1.57542$ GHz, $sTEC_D$ represents a slant total electron content (sTEC) along the direct signal path, and $sTEC_1$ and $sTEC_2$ represent sTEC along incident light and the reflected light respectively. sTEC is calculated by the GIM and calculated by a following formula:

$$sTEC_{1,2,D} = \alpha_{1,2,D} \frac{vTEC_{1,2,D}}{\cos(\gamma_{1,2,D})} \quad (3)$$

where $\alpha$ is a proportional factor of ionospheric density above TDS-1 orbit, $\gamma$ is an elevation angle of incident ray at an ionospheric penetration point (IPP), vTEC is vertical TEC at the IPP obtained from the GIM, and subscripts 1, 2 and D represent incident light, reflected light and direct path respectively; values of $\alpha_1$, $\alpha_2$ and $\alpha_D$ are determined based on international reference ionosphere (IRI) 2020 model.

For the reflection over the polar sea ice, a sea ice surface elevation is modeled by using digital elevation model (DEM) or IceSat-2 data products, and a precise GNSS satellite orbit and a clock deviation are obtained from a final orbit of Centre for Orbit Determination in Europe (CODE). Due to the lack of precise orbit information of TDS-1, the orbit error is approximated by a linear trend, that is, the orbit error is approximated by a linear trend, and a GNSS-R satellite orbit error is parameterized as a linear function of time:

$$T_{Orb}^{Fit}(t) = a_0 + a_1 t \quad (4)$$

where $a_0$ and $a_1$ are estimated by least square fitting as follows:

$$(a_0, a_1) = \underset{a_0^*, a_1^*}{\mathrm{argmin}} \sum_{k=1}^{M} \left(\delta\hat{\Phi}_R(t_k) - a_0^* - a_1^* t_k\right)^2 \quad (5)$$

where $t_k$ is a time stamp and M is a number of carrier phase samples of GNSS reflected signals. In addition to the linear components in the orbit error term, the linear components in other error terms such as carrier integer ambiguity and delay correction residual are removed. Then the reflected signal geometric model removing the signal dynamic deviation is expressed as:

$$\hat{\rho}_R = (|\vec{r}_{tx}(t-\Delta t_R) - \vec{r}_{sp}(t)| + |\vec{r}_{sp}(t) - \vec{r}_{rx}(t)|) + b_{tx}(t-\Delta t_R) - b_{rx}(t) \quad (6)$$

where $\vec{r}_{tx}$, $\vec{r}_{sp}$ and $\vec{r}_{rx}$ respectively represent position vector of GNSS satellite, mirror point and position vector of TDS-1 satellite in Earth-Centered, Earth-Fixed (ECEF) coordinates, and $b_{tx}$ and $b_{rx}$ are clock deviations of GNSS transmitter and TDS-1 satellite receiver respectively.

S2.3, obtaining residual phases of the reflected signals with reduced dynamic components by using following formula:

$$\Delta\hat{\Phi}_{R,i}^{OL} = \hat{\Phi}_{R,i}^{OL} - \tilde{\rho}_R + \hat{\rho}_R \quad (7)$$

where the $\Delta\hat{\Phi}_{R,i}^{OL}$ is processed by the wavelet transform, and the signals are decomposed into components with different scales and frequencies by the wavelet transform to obtain time-frequency characteristics of the signals, and cycle slip detection is realized by detecting sudden changes or abnormal phenomena in the signals; when cycle slips occur, data are interpolated or extrapolated to fill missing values or expand a data range, and then phase smoothing filter is applied to deal with noise or fluctuation in the data; in a phase unwrapping process insensitive to the noise, an extended Kalman filter (EKF) algorithm is used to process residual phases of spaceborne GNSS-R measurement, and the observation model is expressed as an in-phase/quadrature (I/Q) nonlinear function; the algorithm is capable of estimating and reducing integer period deviation, reducing measurement noise and realizing cycle slip mitigation; finally, carrier phase measurement result after correcting or reducing cycle slip deviation is as follows:

$$\hat{\Phi}_{R,i}{}^{Corr} = \hat{\rho}R(t) + \Delta\hat{\Phi}_{R,i}{}^{Corr} \tag{8}$$

where $\hat{\Phi}_{R,i}{}^{Corr}$ is the residual phase of the reflected signal after the cycle slip correction.

Further, constructing a grazing angle spaceborne GNSS-R tropospheric wet delay estimation model by combining a grazing angle spaceborne GNSS-R phase measurement theoretical model and a slant tropospheric delay theoretical model considering a mapping function in the S3 includes the following sub-steps.

S3.1, constructing a grazing angle spaceborne GNSS-R phase measurement theoretical model, and an expression is:

$$\Phi_R(t) = |\vec{r}_{tx}(t-\Delta t_R) - \vec{r}_{sp}(t)| + |\vec{r}_{sp}(t) - \vec{r}_{rx}(t)| + I_R(t) + T_R(t) b_{tx}(t-\Delta t_R) - b_{rx}(t) \tag{9}$$

where $\vec{r}_{tx}$, $\vec{r}_{sp}$ and $\vec{r}_{rx}$ respectively represent the position vector of the GNSS satellite, the mirror point and the position vector of the TDS-1 satellite in the Earth-Centered, Earth-Fixed (ECEF) coordinates, and $b_{tx}$ and $b_{rx}$ are the clock deviations of the GNSS transmitter and the TDS-1 satellite receiver respectively, $I_R$ is influence of ionosphere on carrier phase, and $T_R$ is tropospheric delay.

In order to obtain accurate carrier phase estimation for tropospheric delay estimation, it is necessary to correct the errors, noises and cycle slips caused by ionospheric propagation, GNSS satellite orbit and clock error, TDS-1 orbit and clock error. After correcting these errors, the residual carrier phase is mainly affected by tropospheric delay in the atmosphere. Furthermore, the tropospheric information measurement equation may be expressed as:

$$\hat{T}_R(t) = \hat{\Phi}_R(t) - (|\vec{r}_{tx}(t-\Delta t_R) - \vec{r}_{sp}(t)| + |\vec{r}_{sp}(t) - \vec{r}_{rx}(t)|) + b_{tx}(t-\Delta t_R) - b_{rx}(t) - I_R(t) \tag{10}$$

where $\hat{\Phi}_R$ is a reflected signal phase distance.

S3.2, estimating GNSS-R slant tropospheric delay by using the residual phases of the reflected signals:

$$\hat{T}_R(t) = \hat{\Phi}_R(t) - \hat{g}_R(t) - \hat{I}_R(t) + M(t)\lambda + \varepsilon(t) \tag{11}$$

where $\Lambda$ represents an estimation of variables in equation (9), $\hat{g}_R$ represents geometric and clock components in the equation (9), M represents an unknown integer of the phase ambiguity, and ò represents influence of various estimation errors and noises. The slant tropospheric delay is modeled as:

$$T_R(t) = 2 \times (ZHD(t) \times m_{dry}(\theta(t)) + ZWD(t) \times m_{wet}(\theta(t)) + \Delta L_g(e, \alpha)) \tag{12}$$

$$\widehat{ZWD}(t) = \frac{\frac{1}{2}T_R(\theta(t)) - \widehat{ZHD}(t) \times m_{dry}(\theta(t)) - \Delta L_g(e, \alpha) - M(t)\lambda}{m_{wet}(\theta(t))} \tag{13}$$

where $m_{dry}$ and $m_{wet}$ are mapping functions of dry delay and wet delay in the troposphere, $\Delta L_g(e, \alpha)$ is an error caused by a gradient change of the atmosphere in a horizontal direction, e is a cut-off altitude angle of a satellite, a is an azimuth angle of the satellite, $\widehat{ZHD}$ and $\widehat{ZWD}$ are obtained by interpolation based on grid data, and then obtaining a following $\widehat{ZWD}$ expression:

$$\delta\hat{T}_R(t) = \frac{1}{2}\hat{T}_R(\theta(t)) - \widehat{ZHD}(t) \times m_{dry}(\theta(t)) - \widehat{ZWD}(t) \times m_{wet}(\theta(t)) - \Delta L_g(e, \alpha). \tag{14}$$

Further, a calculation expression of the grazing angle spaceborne GNSS-R ZWD in the S4 is:

$$\widehat{ZWD}(t) = \frac{\delta\hat{T}_R(t) - \overline{\delta\hat{T}_R}}{m_{wet}(\theta(t))} + \overline{\widehat{ZWD}}(t) \tag{15}$$

where "-" represents an average value of time series.

Further, in the S5, the $T_m$ value of the target point is calculated based on the GPT3 model, and the $T_m$ value is substituted into the conversion factor II, and then the estimated value of GNSS-R IWV is obtained by combining the calculated GNSS-R ZWD. The calculation formula is as follows:

$$IWV = II \times ZWD \tag{16}$$

$$II = \frac{10^6}{R_V \cdot (k_2' + k_3/T_m)} \tag{17}$$

$$k_2' = k_2 - k_1 \frac{R_d}{R_M}, \quad R_d = R/M_d \tag{18}$$

where $R_v$=461.522 J kg$^{-1}$ K$^{-1}$, $k_1$=77.604 K·hPa$^{-1}$, $k_2$=64.79 K·hPa$^{-1}$, $k_3$=373900 K$^2$·hPa$^{-1}$, R=8.31434 J/(mol·K), R is an ideal universal constant, $M_d$=28.9644×10$^{-3}$ kg/mol, $M_d$ is a molar mass of dry air, and $T_m$ is an atmospheric weighted average temperature.

Further, S6 uses the reference ZWD data and the reference IWV data to verify the inversion performance of GNSS-R ZWD and IWV; where the reference ZWD data is the VMF3 grid data and the reference IWV data is the ERA5 data.

After adopting the technical scheme, compared with the prior art, the disclosure has the following beneficial effects.

The technical scheme of the disclosure has the unique advantages of realizing high precision, high spatial and temporal resolution at low cost and providing atmospheric water vapor observation data for polar ice, so as to fill the blank of atmospheric water vapor observation data in polar regions due to sparse GNSS receivers, inaccessible terrain, orbit inclination limitation of GNSS satellites and the like, which is of great significance to expand and promote the innovative application of grazing angle spaceborne GNSS-R technology in observing ZWD and IWV.

The specific embodiments of the present disclosure will be described in further detail with reference to the accompanying drawings.

BRIEF DESCRIPTION OF THE DRAWINGS

The accompanying drawings, which are a part of this application, are used to provide a further understanding of the disclosure. The illustrative embodiments of the disclosure and their descriptions are used to explain the disclosure, but they do not constitute an improper limitation of the disclosure. Obviously, the attached drawings in the following description are only some embodiments, and other drawings may be obtained according to these drawings without creative work for ordinary people in the field. In the attached drawings.

It should be noted that these drawings and written descriptions are not intended to limit the conceptual scope of the disclosure in any way, but to explain the concept of the disclosure to those skilled in the art by referring to specific embodiments.

DETAILED DESCRIPTION OF THE EMBODIMENTS

In order to make the objective, technical scheme and advantages of the embodiment of the present disclosure more clear, the technical scheme in the embodiment of the present disclosure will be described clearly and completely with the accompanying drawings. The following embodiments are used to illustrate the present disclosure, but are not used to limit the scope of the present disclosure.

Embodiment 1

In order to verify the effectiveness of the proposed method, the TDS-1 raw intermediate frequency signal observation data, VMF3 grid data, GPT3 grid data and ERA5 data from Sep. 1, 2014 to Mar. 25, 2019 are obtained for experiments, and the experimental results of the disclosure are compared with reference data.

The disclosure relates to a method for retrieving tropospheric wet delay and atmospheric water vapor content over polar sea ice with TDS-1 satellite grazing angle spaceborne GNSS-R, including the following steps.

S1, obtaining TDS-1 GNSS-R raw intermediate frequency signal data, VMF3 grid data, GPT3 grid data and ERA5 data;

where the acquisition time of TDS-1 raw intermediate frequency signal data set is from Sep. 1, 2014 to Mar. 25, 2019, including the raw intermediate frequency signals reflected by single-frequency multi-constellation GNSS (GPS/Galileo/BeiDou-3). the VMF3 grid data is 1° tropospheric wet delay data estimated by a VMF model, GPT3 grid data is atmospheric weighted average temperature data estimated by the GPT3 model, and ERA5 data is atmospheric water vapor content data.

S2, correcting an error of a tropospheric wet delay estimation of the grazing angle spaceborne GNSS-R; correcting the error of the tropospheric wet delay estimation of the grazing angle spaceborne GNSS-R in the S2 includes dynamic phase components and deviation removal and phase reconstruction; where the dynamic phase components and deviation removal includes clock deviation, orbit error, ionospheric error and phase ambiguity, and the phase reconstruction includes cycle slip identification based on wavelet transform and cycle slip correction based on extended Kalman filter, including the following sub-steps.

S2.1, before correcting each error, processing raw intermediate frequency observation data of TDS-1 satellite, including closed-loop processing of direct signals and calculation of open-loop (OL) tracking model of reflected signals; where carrier phase $\hat{\Phi}_{R,i}^{OL}$ of the reflected signals calculated by the open-loop tracking model is expressed by a following formula:

$$\hat{\Phi}_{R,i}^{OL} = \tilde{\rho}_R + \delta\hat{\Phi}_{R,i} + \lambda_1 N_{R,i}^{OL} \quad (1)$$

where $N_{R,i}^{OL}$ is phase integer ambiguity, $\delta\hat{\Phi}_{R,i}$ is residual carrier phase estimation, $\lambda_1$ GNSS signal wavelength, and $\tilde{\rho}_R$ is a reflected signal geometric model including cycle slips and signal dynamic deviation.

S2.2, modeling and eliminating dynamic phase components before the cycle slip correction; where a receiver clock deviation is estimated from a direct signal measurement, the current TDS-1 satellite only generates a single frequency measurement result, so an ionospheric correction formula is derived by using vertical total electron content (vTEC) model provided by global ionospheric map (GIM) of international GNSS service (IGS) as follows:

$$I_R = -\frac{40.3}{f_{L1}^2}(sTEC_1 + sTEC_2 - sTEC_D) \quad (2)$$

where for GPS L1 signals, $f_L$=1.57542 GHz, $sTEC_D$ represents a slant total electron content (sTEC) along the direct signal path, and $sTEC_1$ and $sTEC_2$ represent sTEC along incident light and the reflected light respectively. sTEC is calculated by the GIM and calculated by a following formula:

$$sTEC_{1,2,D} = \alpha_{1,2,D} \frac{vTEC_{1,2,D}}{\cos(\gamma_{1,2,D})} \quad (3)$$

where $\alpha$ is a proportional factor of ionospheric density above TDS-1 orbit, $\gamma$ is an elevation angle of incident ray at an ionospheric penetration point (IPP), vTEC is vertical TEC at the IPP obtained from the GIM, and subscripts 1, 2 and D represent incident light, reflected light and direct path respectively; values of $\alpha_1$, $\alpha_2$ and $\alpha_D$ are determined based on international reference ionosphere (IRI) 2020 model.

For the reflection over the polar sea ice, a sea ice surface elevation is modeled by using digital elevation model (DEM) or IceSat-2 data products, and a precise GNSS satellite orbit and a clock deviation are obtained from a final orbit of Centre for Orbit Determination in Europe (CODE). Due to the lack of precise orbit information of TDS-1, the orbit error is approximated by a linear trend, that is, the orbit error is approximated by a linear trend, and a GNSS-R satellite orbit error is parameterized as a linear function of time:

$$T_{Orb}^{Fit}(t)=a_0+a_1 t \quad (4)$$

where $\alpha_0$ and $\alpha_1$ are estimated by least square fitting as follows:

$$(a_0, a_1) = \mathrm{argmin} \sum_{k=1}^{M} \left(\delta\hat{\Phi}_R(t_k) - a_0^* - a_1^* t_k\right)^2 \quad (5)$$

where $t_k$ is a time stamp and M is a number of carrier phase samples of GNSS reflected signals. In addition to the linear components in the orbit error term, the linear components in other error terms such as carrier integer ambiguity and delay correction residual are removed.

Then the reflected signal geometric model removing the signal dynamic deviation is expressed as:

$$\hat{\rho}R=(|\vec{r}_{tx}(t-\Delta t_R)-\vec{r}_{sp}(t)|+|\vec{r}_{sp}(t)-\vec{r}_{rx}(t)|)+b_{tx}(t-\Delta t_R)-b_{rx}(t) \quad (6)$$

where $\vec{r}_{tx}$, $\vec{r}_{sp}$ and $\vec{r}_{rx}$ respectively represent position vector of GNSS satellite, mirror point and position vector of TDS-1 satellite in Earth-Centered, Earth-Fixed (ECEF) coordinates, and $b_{tx}$ and $b_{rx}$ are clock deviations of GNSS transmitter and TDS-1 satellite receiver respectively.

S2.3, obtaining residual phases of the reflected signals with reduced dynamic components by using the following formula:

$$\Delta\hat{\Phi}_{R,i}^{OL}=\hat{\Phi}_{R,i}^{OL}-\hat{\rho}_R+\hat{\rho}_R \quad (7)$$

herein the $\Delta\hat{\Phi}_{R,i}^{OL}$ is processed by the wavelet transform, and the signals are decomposed into components with different scales and frequencies by the wavelet transform to obtain time-frequency characteristics of the signals, and cycle slip detection is realized by detecting sudden changes or abnormal phenomena in the signals; when cycle slips occur, data are interpolated or extrapolated to fill missing values or expand a data range, and then phase smoothing filter is applied to deal with noise or fluctuation in the data; in a phase unwrapping process insensitive to the noise, an extended Kalman filter (EKF) algorithm is used to process residual phases of spaceborne GNSS-R measurement, and the observation model is expressed as an in-phase/quadrature (I/Q) nonlinear function; the algorithm is capable of estimating and reducing integer period deviation, reducing measurement noise and realizing cycle slip mitigation; finally, carrier phase measurement result after correcting or reducing cycle slip deviation is as follows:

$$\hat{\Phi}_{R,i}^{Corr}=\hat{\rho}R(t)+\Delta\hat{\Phi}_{R,i}^{Corr} \quad (8)$$

where $\hat{\Phi}_{R,i}^{Corr}$ is the residual phase of the reflected signal after the cycle slip correction.

S3, constructing a grazing angle spaceborne GNSS-R tropospheric wet delay estimation model by combining a grazing angle spaceborne GNSS-R phase measurement theoretical model and a slant tropospheric delay theoretical model considering a mapping function, specifically including following sub-steps:

S3.1, constructing a grazing angle spaceborne GNSS-R phase measurement theoretical model, and an expression is:

$$\Phi_R(t)=|\vec{r}_{tx}(t-\Delta t_R)-\vec{r}_{sp}(t)|+|\vec{r}_{sp}(t)-\vec{r}_{rx}(t)|+I_R(t)+T_R(t)b_{tx}(t-\Delta t_R)-b_{rx}(t) \quad (9)$$

where $\vec{r}_{tx}$, $\vec{r}_{sp}$ and $\vec{r}_{rx}$ respectively represent the position vector of the GNSS satellite, the mirror point and the position vector of the TDS-1 satellite in the Earth-Centered, Earth-Fixed (ECEF) coordinates, and $b_{tx}$ and $b_{rx}$ are the clock deviations of the GNSS transmitter and the TDS-1 satellite receiver respectively, $I_R$ is influence of ionosphere on carrier phase, and $T_R$ is tropospheric delay.

In order to obtain accurate carrier phase estimation for tropospheric delay estimation, it is necessary to correct the errors, noises and cycle slips caused by ionospheric propagation, GNSS satellite orbit and clock error, TDS-1 orbit and clock error. After correcting these errors, the residual carrier phase is mainly affected by tropospheric delay in the atmosphere. Furthermore, the tropospheric information measurement equation may be expressed as:

$$\hat{T}_R(t)=\hat{\Phi}_R(t)-(|\vec{r}_{tx}(t-\Delta t_R)-\vec{r}_{sp}(t)|+|\vec{r}_{sp}(t)-\vec{r}_{tx}(t)|)+b_{tx}(t-\Delta t_R)-b_{rx}(t)-I_R(t) \quad (10)$$

where $\hat{\Phi}_R$ is a reflected signal phase distance.

S3.2, estimating GNSS-R slant tropospheric delay by using the residual phases of the reflected signals:

$$\hat{T}_R(t)=\hat{\Phi}_R(t)-\hat{g}_R(t)-\hat{I}_R(t)+M(t)\lambda+\varepsilon(t) \quad (11)$$

where $\Lambda$ represents an estimation of variables in equation (9), $\hat{g}_R$ represents geometric and clock components in the equation (9), M represents an unknown integer of the phase ambiguity, and $\delta$ represents influence of various estimation errors and noises. The slant tropospheric delay is modeled as:

$$T_R(t) = 2 \times (ZHD(t) \times m_{dry}(\theta(t)) + ZWD(t) \times m_{wet}(\theta(t)) + \Delta L_g(e, \alpha)) \quad (12)$$

$$\widetilde{ZWD}(t) = \frac{\frac{1}{2}\hat{T}_R(\theta(t)) - \overline{ZHD}(t) \times m_{dry}(\theta(t)) - \Delta L_g(e, \alpha) - M(t)\lambda}{m_{wet}(\theta(t))} \quad (13)$$

where $m_{dry}$ and $m_{wet}$ are mapping functions of dry delay and wet delay in the troposphere, $\Delta L_g(e,\alpha)$ is an error caused by a gradient change of the atmosphere in a horizontal direction, e is a cut-off altitude angle of a satellite, $\alpha$ is an azimuth angle of the satellite, $\overline{ZHD}$ and $\overline{ZWD}$ are obtained by interpolation based on grid data, and then obtaining a following expression:

$$\delta\hat{T}_R(t) = \frac{1}{2}\hat{T}_R(\theta(t)) - \overline{ZHD}(t) \times m_{dry}(\theta(t)) - \overline{ZWD}(t) \times m_{wet}(\theta(t)) - \Delta L_g(e, \alpha). \quad (14)$$

S4, calculating grazing angle spaceborne GNSS-R ZWD, and the calculation expression is:

$$\widetilde{ZWD}(t) = \frac{\delta\hat{T}_R(t) - \overline{\delta\hat{T}_R}}{m_{wet}(\theta(t))} + \overline{ZWD}(t) \quad (15)$$

where "-" represents an average value of time series.

S5, the $T_m$ value of the target point is calculated based on the GPT3 model, and the $T_m$ value is substituted into the conversion factor II, and then the estimated value of GNSS-R IWV is obtained by combining the calculated GNSS-R ZWD. The calculation formula is as follows:

$$IWV = \Pi \times ZWD \tag{16}$$

$$\Pi = \frac{10^6}{R_V \cdot (k_2' + k_3/T_m)} \tag{17}$$

$$k_2' = k_2 - k_1 \frac{R_d}{R_v}, R_d = R/M_d \tag{18}$$

where $R_v$=461.522 J kg$^{-1}$ K$^{-1}$, $k_1$=77.604 K·hPa$^{-1}$, $k_2$=64.79 K·hPa$^{-1}$, $k_3$=373900 K$^2$·hPa$^{-1}$, R=8.31434 J/(mol·K), R is an ideal universal constant, $M_d$=28.9644×10$^{-3}$ kg/mol, $M_d$ is a molar mass of dry air, and $T_m$ is an atmospheric weighted average temperature.

S6, using the reference ZWD data and the reference IWV data to verify the inversion performance of GNSS-R ZWD and IWV; where the reference ZWD data is the VMF3 grid data and the reference IWV data is the ERA5 data.

Figure 1:
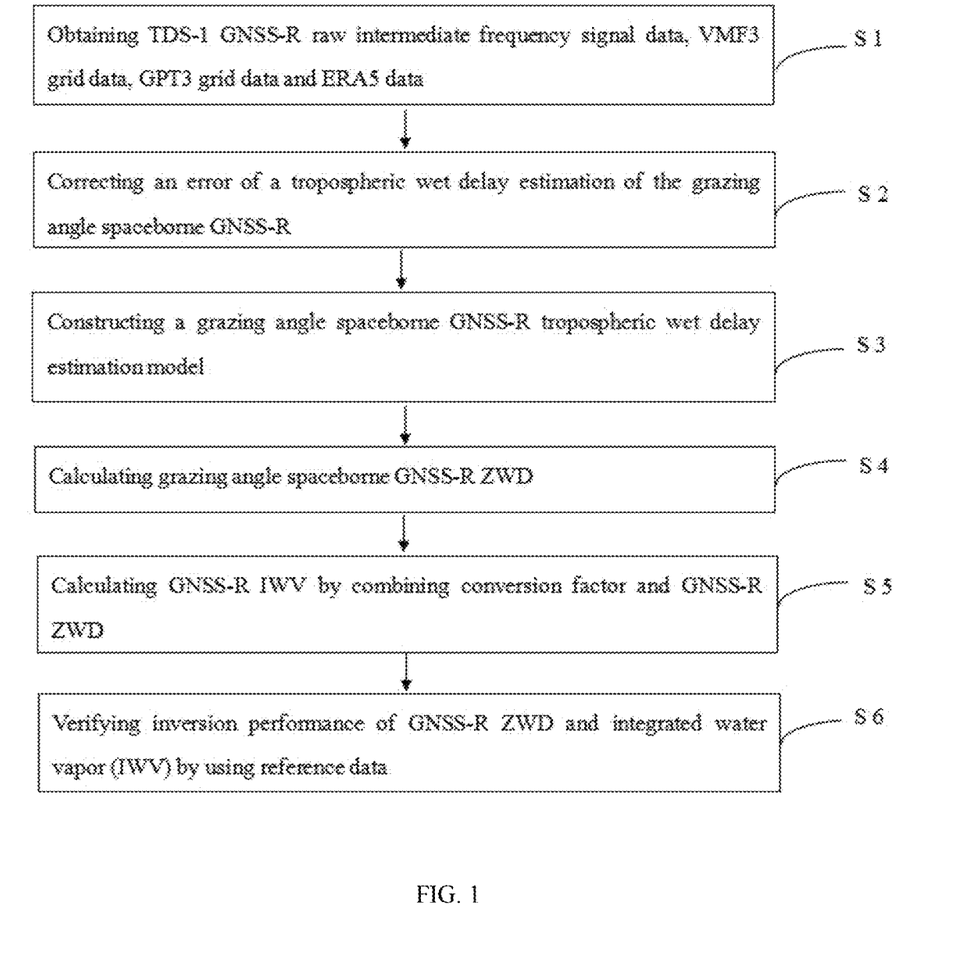
FIG. 1 is a flow chart of the present disclosure.
Figure 2A:
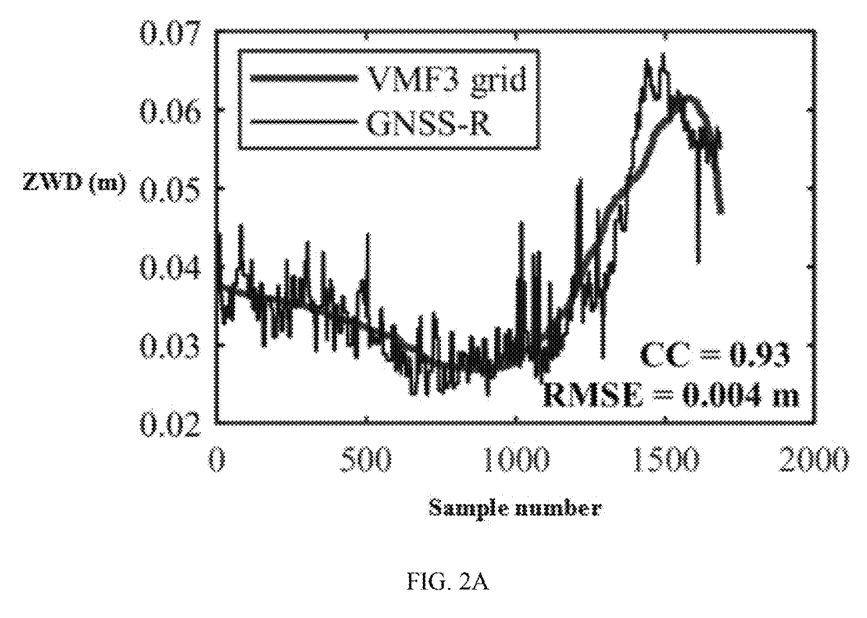
FIG. 2A is a comparison result of tropospheric wet delay estimated in the VMF3 grid model and retrieved from data of trajectory 1 in GNSS-R of TDS-1 satellite in the embodiment of the present disclosure.
Figure 2B:
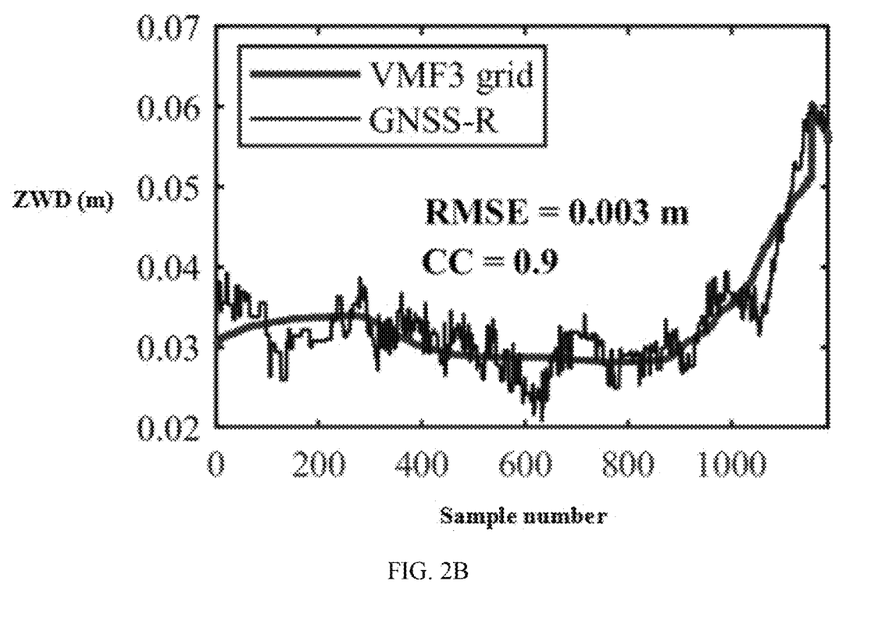
FIG. 2B is a comparison result of tropospheric wet delay estimated in the VMF3 grid model and retrieved from data of trajectory 2 in GNSS-R of TDS-1 satellite in the embodiment of the present disclosure.
Figure 3A:
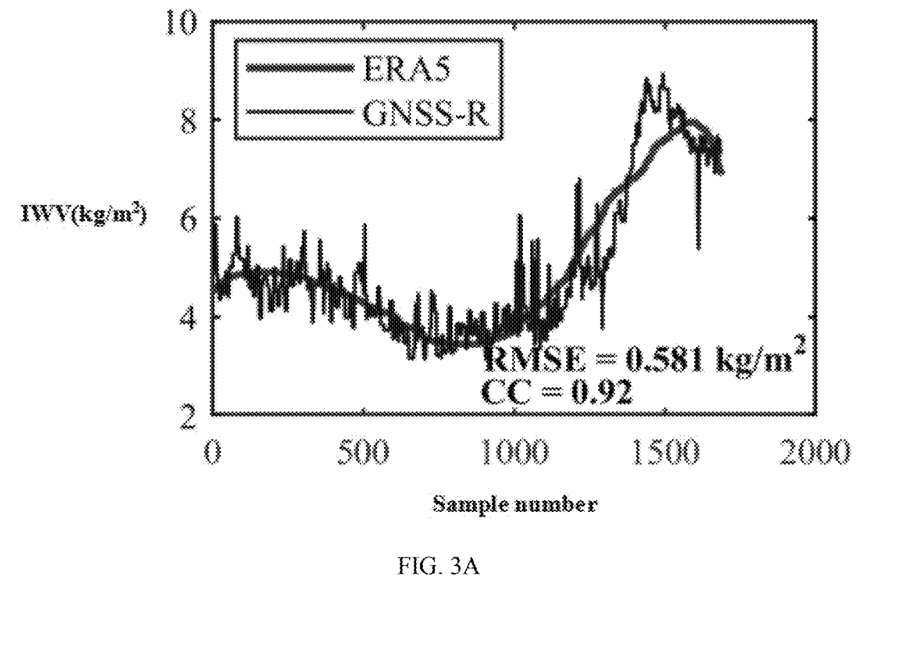
FIG. 3A is a comparison result between the atmospheric water vapor content retrieved from the spaceborne GNSS-R data of trajectory 1 of TDS-1 satellite and the atmospheric water vapor content provided by ERA5 in the embodiment of the present disclosure.
Figure 3B:
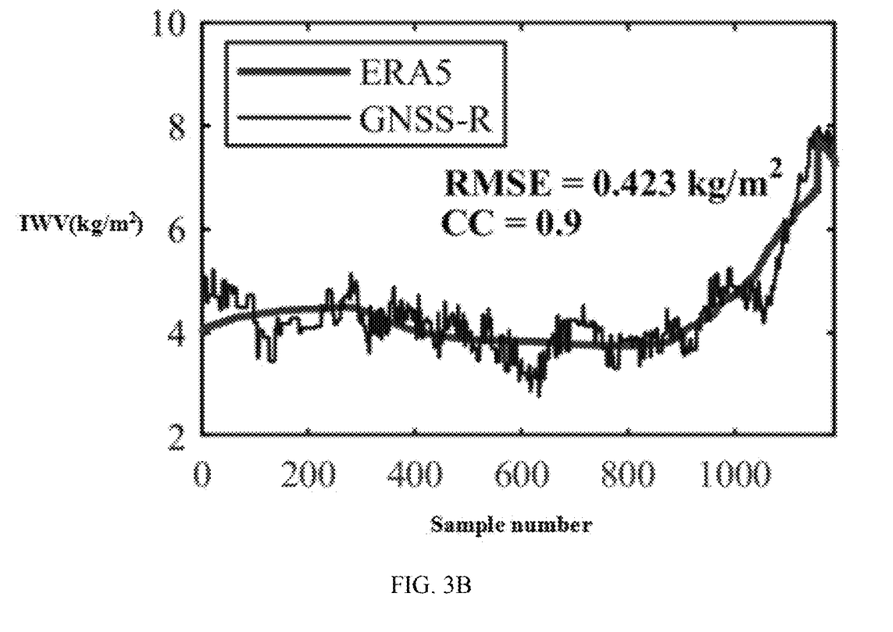
FIG. 3B is a comparison result between the atmospheric water vapor content retrieved from the spaceborne GNSS-R data of trajectory 2 of TDS-1 satellite and the atmospheric water vapor content provided by ERA5 in the embodiment of the present disclosure.

FIG. 2A-FIG. 2B show the estimated ZWD of ZWD and VMF3 grid model retrieved from the two trajectory data of TDS-1 satellite spaceborne GNSS-R. FIG. 3A-FIG. 3B show the IWV estimated by GNSS-R ZWD and the IWV of the interpolated ERA5 data along two trajectories.

As can be seen from FIG. 2A-FIG. 2B and FIG. 3A-FIG. 3B, the inversion results of GNSS-R ZWD and the estimation results of VMF3 grid model have good consistency and high accuracy, and gradients are observed from two GNSS-R orbits with similar steepness. In addition, the inversion results of GNSS-R IWV are in good agreement with those of ERA5 IWV. These preliminary results show that it is feasible to invert ZWD and IWV in high latitudes by using TDS-1 grazing angle spaceborne GNSS-R raw intermediate frequency signal data.

The above is only the preferred embodiment of the present disclosure, and it does not limit the present disclosure in any form. Although the present disclosure has been disclosed in the preferred embodiment, it is not used to limit the present disclosure. Any person familiar with this patent may make some changes or modify it into an equivalent embodiment by using the technical content suggested above without departing from the technical scheme of the present disclosure. However, any simple modification to the above embodiment is made according to the technical essence of the present disclosure.

What is claimed is:

1. A method for retrieving tropospheric wet delay and atmospheric water vapor content over polar sea ice with TDS-1 satellite grazing angle spaceborne GNSS-R, comprising the following steps:

Step 1, obtaining TDS-1 GNSS-R raw intermediate frequency signal data, VMF3 grid data, GPT3 grid data and ERA5 data;

Step 2, correcting an error of a tropospheric wet delay estimation of the grazing angle spaceborne GNSS-R, comprising: preprocessing raw intermediate frequency signals of the TDS-1 satellite by performing closed-loop tracking of direct signals and computing reflected signal carrier phases using an open-loop tracking model; removing dynamic phase components comprises receiver clock deviation, orbit error, ionospheric delay, and carrier phase ambiguity by approximating orbit error through a time-dependent correction function and performing ionospheric delay correction using total electron content information obtained from a global ionospheric map and ionospheric reference model data; reconstructing reflected signal phases by segmenting the residual carrier phase into different frequency components using wavelet transform, mitigating signal discontinuities caused by cycle slips through interpolation, and suppressing phase fluctuations using a filtering process; and correcting residual phase discontinuities by applying a phase unwrapping procedure based on an extended Kalman filter, implemented with a nonlinear signal model configured for in-phase and quadrature data, to produce a continuous and stabilized carrier phase measurement;

Step 3, constructing a grazing angle spaceborne GNSS-R tropospheric wet delay estimation model by combining a grazing angle spaceborne GNSS-R phase measurement theoretical model and a slant tropospheric delay theoretical model considering a mapping function; specifically comprises following sub-steps:

Step 3.1, constructing the grazing angle spaceborne GNSS-R phase measurement theoretical model, wherein an expression is:

$$\Phi_R(t) = |\vec{r}_{tx}(t-\Delta t_R) - \vec{r}_{sp}(t)| + |\vec{r}_{sp}(t) - \vec{r}_{tx}(t)| + I_R(t) + T_R(t)b_{tx}(t-\Delta t_R) - b_{rx}(t) \tag{9}$$

wherein $\vec{r}_{tx}$, $\vec{r}_{sp}$ and $\vec{r}_{rx}$ respectively represent a position vector of a GNSS satellite, a mirror point and a position vector of a TDS-1 satellite in Earth-Centered, Earth-Fixed (ECEF) coordinates, and $b_{tx}$ and $b_{rx}$ are clock deviations of a GNSS transmitter and a TDS-1 satellite receiver respectively, $I_R$ is influence of ionosphere on a carrier phase, and $T_R$ is tropospheric delay;

after correcting errors, noises and cycle slips caused by ionospheric propagation, a GNSS satellite orbit and clock error, a TDS-1 orbit and clock error, residual carrier phases are mainly affected by the tropospheric delay in atmosphere, and a tropospheric information measurement equation is expressed as:

$$\hat{T}_R(t) = \hat{\Phi}_R(t) - (|\vec{r}_{tx}(t-\Delta t_R) - \vec{r}_{sp}(t)| + |\vec{r}_{sp}(t) - \vec{r}_{tx}(t)|) + b_{tx}(t-\Delta t_R) - b_{rx}(t) - I_R(t) \tag{10}$$

wherein $\hat{\Phi}_R$ is a reflected signal phase distance;

Step 3.2, estimating GNSS-R slant tropospheric delay by using residual phases of reflected signals:

$$\hat{T}_R(t) = \hat{\Phi}_R(t) - \hat{g}_R(t) - \hat{I}_R(t) + M(t)\lambda + \epsilon(t) \tag{11}$$

wherein $\Lambda$ represents an estimation of variables in equation (9), $\hat{g}_R$ represents geometric and clock components in the equation (9), M represents an unknown integer of a phase ambiguity, and δ represents influence of various estimation errors and noises;

the slant tropospheric delay is modeled as:

$$T_R(t) = 2 \times (ZHD(t) \times m_{dry}(\theta(t)) + ZWD(t) \times m_{wet}(\theta(t)) + \Delta L_g(e, \alpha)) \tag{12}$$

$$\widehat{ZWD}(t) = \frac{\frac{1}{2}\hat{T}_R(\theta(t)) - \widehat{ZHD}(t) \times m_{dry}(\theta(t)) - \Delta L_g(e, \alpha) - M(t)\lambda}{m_{wet}(\theta(t))} \tag{13}$$

wherein $m_{dry}$ and $m_{wet}$ are mapping functions of dry delay and wet delay in troposphere, $\Delta L_a(e,\alpha)$ is an error caused by a gradient change of the atmosphere in a horizontal direction, e is a cut-off altitude angle of a satellite, a is an azimuth angle of the satellite, $\widehat{ZHD}$ and $\widehat{ZWD}$ are obtained by interpolation based on grid data, and then obtaining a following expression:

$$\delta \hat{T}_R(t) = \tag{14}$$

$$\frac{1}{2}\hat{T}_R(\theta(t)) - \overline{ZHD}(t) \times m_{dry}(\theta(t)) - \overline{ZWD}(t) \times m_{wet}(\theta(t)) - \Delta L_g(e, \alpha);$$

Step 4, calculating grazing angle spaceborne GNSS-R ZWD;

Step 5, calculating a $T_m$ value of a target point based on a GPT3 model, substituting the $T_m$ value into a conversion factor II, and combining calculated GNSS-R ZWD to obtain a GNSS-R IWV estimated value; and Step 6, verifying inversion performance of GNSS-R ZWD and IWV by using reference data.

2. The method for retrieving the tropospheric wet delay and the atmospheric water vapor content over the polar sea ice with the TDS-1 satellite grazing angle spaceborne GNSS-R according to claim 1, wherein a raw intermediate frequency signal data set of TDS-1 comprises raw intermediate frequency signals reflected by single-frequency multi-constellation GNSS (GPS/Galileo/BeiDou-3); the VMF3 grid data is 1° tropospheric wet delay data estimated by a VMF model, GPT3 grid data is atmospheric weighted average temperature data estimated by the GPT3 model, and ERA5 data is atmospheric water vapor content data.

3. The method for retrieving the tropospheric wet delay and the atmospheric water vapor content over the polar sea ice with the TDS-1 satellite grazing angle spaceborne GNSS-R according to claim 1, wherein the carrier phase $\hat{\Phi}_{R,i}^{OL}$ of the reflected signals calculated by the open-loop tracking model is expressed by a following formula:

$$\hat{\Phi}_{R,i}^{OL} = \tilde{\rho}_R + \delta \hat{\Phi}_{R,i} + \lambda_1 N_{R,i}^{OL} \tag{1}$$

wherein $N_{R,i}^{OL}$ is phase integer ambiguity, and $\tilde{\rho}_R$ is a reflected signal geometric model comprising cycle slips and signal dynamic deviation;

modeling and eliminating most of the dynamic phase components before the cycle slip correction; wherein a receiver clock deviation is estimated from a direct signal measurement, and an ionospheric correction formula is derived by using vertical total electron content (vTEC) model provided by global ionospheric map (GIM) of international GNSS service (IGS) as follows:

$$I_R = -\frac{40.3}{f_{L1}^2}(sTEC_1 + sTEC_2 - sTEC_D) \tag{2}$$

wherein for GPS L1 signals, $f_{L1}$=0.57542 GHz, $sTEC_D$ represents a slant total electron content (sTEC) along a direct signal path, and $sTEC_1$ and $sTEC_2$ represent sTEC along incident light and reflected light respectively;

wherein for reflection over the polar sea ice, a sea ice surface elevation is modeled by using a digital elevation model (DEM) or IceSat-2 data products, and a precise GNSS satellite orbit and a clock deviation are obtained from a final orbit of Centre for Orbit Determination in Europe (CODE); the orbit error is approximated by a linear trend, and a GNSS-R satellite orbit error is parameterized as a linear function of time:

$$T_{Orb}^{Fit}(t) = a_0 + a_1 t \tag{3}$$

wherein $a_0$ and $a_1$ are estimated by least square fitting as follows:

$$(a_0, a_1) = \underset{a_0^*, a_1^*}{\operatorname{argmin}} \sum_{k=1}^{M}\left(\delta \hat{\Phi}_R(t_k) - a_0^* - a_1^* t_k\right)^2 \tag{4}$$

wherein $t_k$ is a time stamp and M is a number of carrier phase samples of GNSS reflected signals;

then the reflected signal geometric model removing the signal dynamic deviation is expressed as:

$$\tilde{\rho}R = (|\vec{r}_{tx}(t-\Delta t_R) - \vec{r}_{sp}(t)| + |\vec{r}_{sp}(t) - \vec{r}_{rx}(t)|) + b_{tx}(t-\Delta t_R) - b_{rx}(t) \tag{5}$$

wherein $\vec{r}_{tx}$, $\vec{r}_{sp}$, and $\vec{r}_{rx}$ respectively represent the position vector of the GNSS satellite, the mirror point and the position vector of the TDS-1 satellite in the Earth-Centered, Earth-Fixed (ECEF) coordinates, and $b_{tx}$ and $b_{rx}$ are the clock deviations of the GNSS transmitter and the TDS-1 satellite receiver respectively;

obtaining the residual phases of the reflected signals with reduced dynamic components by using a following formula:

$$\Delta \hat{\Phi}_{R,i}^{OL} = \hat{\Phi}_{R,i}^{OL} - \tilde{\rho}_R + \hat{\rho}_R \tag{6}$$

wherein the $\Delta \hat{\Phi}_{R,i}^{OL}$ is processed by the wavelet transform, and the signals are decomposed into components with different scales and frequencies by the wavelet transform to obtain time-frequency characteristics of the signals, and cycle slip detection is realized by detecting sudden changes or abnormal phenomena in the signals; when the cycle slips occur, data are interpolated or extrapolated to fill missing values or expand a data range, and then phase smoothing filter is applied to deal with noise or fluctuation in the data; in a phase unwrapping process insensitive to the noise, an extended Kalman filter (EKF) algorithm is used to process residual phases of spaceborne GNSS-R measurement, and an observation model is expressed as an in-phase/quadrature (I/Q) nonlinear function; the algorithm is capable of estimating and reducing integer period deviation, reducing measurement noise and realizing cycle slip mitigation; finally, a carrier phase measurement result after correcting or reducing cycle slip deviation is as follows:

$$\hat{\Phi}_{R,i}^{Corr} = \hat{\rho}R(t) + \Delta \hat{\Phi}_{R,i}^{Corr} \tag{7}$$

wherein $\hat{\Phi}_{R,i}^{Corr}$ is a residual phase of a reflected signal after the cycle slip correction.

4. The method for retrieving the tropospheric wet delay and the atmospheric water vapor content over the polar sea ice with the TDS-1 satellite grazing angle spaceborne GNSS-R according to claim 3, wherein the sTEC is calculated by the GIM by a following formula:

$$sTEC_{1,2,D} = \alpha_{1,2,D} \frac{vTEC_{1,2,D}}{\cos(\gamma_{1,2,D})} \tag{8}$$

wherein $\alpha$ is a proportional factor of ionospheric density above the TDS-1 orbit, $\gamma$ is an elevation angle of incident ray at an ionospheric penetration point (IPP), vTEC is vertical TEC at the IPP obtained from the GIM, and subscripts 1, 2 and D represent incident light, reflected light and direct path respectively; values of $\alpha_1$, $\alpha_2$ and $\alpha_D$ are determined based on an international reference ionosphere (IRI) 2020 model.

5. The method for retrieving the tropospheric wet delay and the atmospheric water vapor content over the polar sea ice with the TDS-1 satellite grazing angle spaceborne GNSS-R according to claim 1, wherein a calculation expression of the grazing angle spaceborne GNSS-R ZWD in the step 4 is:

$$\widehat{ZWD}(t) = \frac{\delta \hat{T}_R(t) - \overline{\delta \hat{T}_R}}{m_{wet}(\theta(t))} + \overline{ZWD}(t) \quad (15)$$

wherein "-" represents an average value of time series.

6. The method for retrieving the tropospheric wet delay and the atmospheric water vapor content over the polar sea ice with the TDS-1 satellite grazing angle spaceborne GNSS-R according to claim 1, wherein a calculation formula of the step 5 is as follows:

$$IWV = \Pi \times ZWD \quad (16)$$

$$\Pi = \frac{10^6}{R_V \cdot (k_2' + k_3/T_m)} \quad (17)$$

$$k_2' = k_2 - k_1 \frac{R_d}{R_v}, \; R_d = R/M_d \quad (18)$$

wherein $R_v$=461.522 J kg$^{-1}$, $k_1$=77.604 K·hPa$^{-1}$, $k_2$=64.79 K·hPa$^{-1}$, $k_3$=373900 K$^2$·hPa$^{-1}$, R=8.31434 J/(mol·K), is an ideal universal constant, $M_a$=28.9644× 10$^{-3}$ kg/mol, is a molar mass of dry air, and $T_m$ is an atmospheric weighted average temperature calculated by the GPT3 model.

7. The method for retrieving the tropospheric wet delay and the atmospheric water vapor content over the polar sea ice with the TDS-1 satellite grazing angle spaceborne GNSS-R according to claim 1, wherein the step 6 is: verifying retrieval performance of the GNSS-R ZWD and the IWV by using reference ZWD data and reference IWV data;

wherein the reference ZWD data is the VMF3 grid data and the reference IWV data is the ERA5 data.

* * * * *